Figure 1:
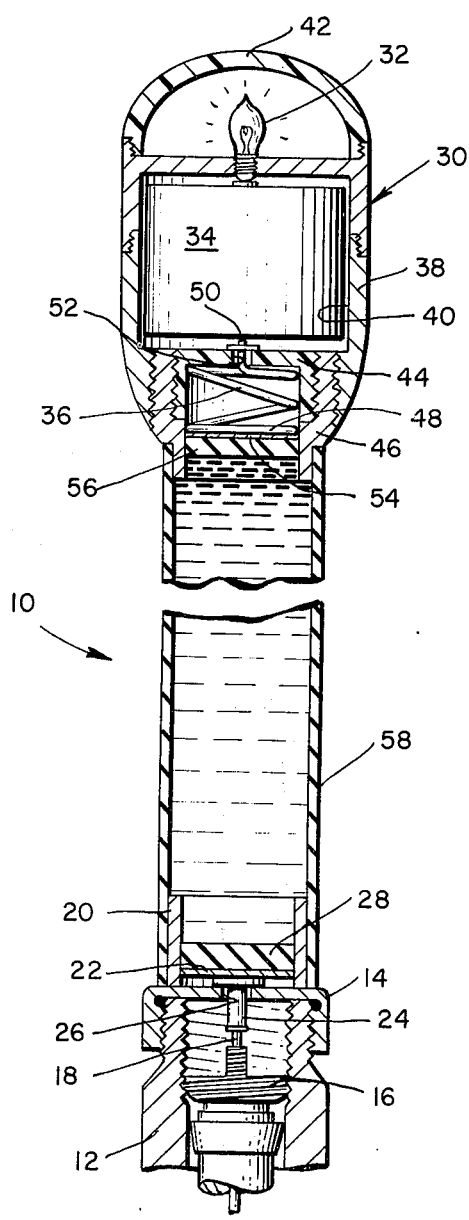

United States Patent [19]
Davis et al.

[11] 3,938,078

[45] Feb. 10, 1976

[54] LOW TIRE PRESSURE INDICATING DEVICE

[75] Inventors: Raymond D. Davis, Jacksonville, Ark.; Z. Y. Plant, Jr., Ontario, Calif.

[73] Assignees: R. Davis, Jacksonville, Ark.; Z. Y. Plant; W. Tribbey, both of Ontario, Calif.

[22] Filed: Jan. 8, 1975

[21] Appl. No.: 539,388

[52] U.S. Cl. ............................... 340/58; 200/61.25
[51] Int. Cl.² ......................................... B60C 23/04
[58] Field of Search ......... 340/58; 200/61.22, 61.25

[56] References Cited
UNITED STATES PATENTS
3,680,523  8/1972  Gaskins............................ 340/58 X

*Primary Examiner*—Alvin H. Waring
*Attorney, Agent, or Firm*—Singer & Singer

[57] ABSTRACT

A device adapted to be directly connected to the valve stem of automobile tires to indicate a low pressure condition. The device comprises a light, a battery, and a compressionable spring switch assembly uniquely responsive to a low pressure condition in the tires for operating the switch assembly thereby connecting an electrical circuit to energize the bulb. A fail-safe feature immediately prevents the loss of fluid pressure from the tire being measured should the device be damaged either maliciously or by road hazards. The low pressure signals indicated by an energized light are adapted to be seen by the driver through suitably placed mirrors located on the vehicle.

11 Claims, 2 Drawing Figures

U.S. Patent  Feb. 10, 1976  3,938,078

LOW TIRE PRESSURE INDICATING DEVICE

This invention relates to a low pressure tire measuring apparatus and specifically to a device capable of being secured to each individual tire of a vehicle and in which a light on the device is energized in the presence of a low pressure detection.

With the increasing costs of tires, both for commercial vehicles and for pleasure vehicles, it has become highly desirous from an economic point of view to insure that the tire pressure does not fall below some arbitrary lower value.

The prior art concerning tires has shown that lower than normal air pressure in the tire is the major cause of blowouts, uneven wearing, and general deterioration of the tire. The commercial truck and bus operators are particularly concerned with obtaining optimum use from tires used on over-the-road vehicles since the replacement of tires represents a major expense in the operation of the trucking or busing business.

It is a well known fact that operating tires at lower than normal pressure increases the wear of the tire and thereby reduces the efficiency of the particular unit on the road and hence increases the cost for transporting any given vehicle. In view of the high cost of replacing truck tires, it is envisioned that the difference between a profitable operation and one that is not profitable can be traced to the obtaining of maximum usage of tires on the rolling stock.

The prior art has recognized the need for automatic low pressure tire indicating systems. Unfortunately these prior art devices have been complicated, unduly expensive, and overly sophisticated for the market being served.

For example, U.S. Pat. No. 3,533,063 issued to G. E. Garcia on Oct. 6, 1970, describes the use of a radio transmitter receiving signals from each of the four tires. In the advent of a detected low pressure condition, the radio transmitter generates a signal which is received by a radio receiver located in the cab of the vehicle.

In U.S. Pat. No. 2,229,192 issued to L. Schultz on Jan. 21, 1941, there is disclosed a mechanical indicating device located in the cab portion of the vehicle having indicia directly related to the pressure of the individual four tires.

The prior art also discloses additional devices requiring special adaptation devices such as illustrated in U.S. Pat. No. 2,740,855 issued to F. E. Welpott, et al., on Apr. 3, 1956.

These prior art devices have not been accepted by the commercial market because of the inherent complexity and special valve arrangements needed to sense the low pressure in the individual tire. Additionally, the individual display devices in the cab of the vehicle have necessitated additional wiring, in some cases radio receivers and transmitters and other complicated and sophisticated apparatus that is generally not trusted by the truck operator and user.

In the present invention there is disclosed a completely portable device that is attached to the valve stem of the individual tire to be monitored. Each device is self-contained and separate from every other device and includes as an intrical part a battery, a light, and a compressionable spring switch assembly controlled by the pressure in the tire. In the event of a lower than normal pressure reading, the spring switch assembly is actuated causing the light to be energized, indicating to the observer that the particular tire in question has a low indicated pressure.

In the preferred embodiment, the individual devices are attached to the valve stem of the individual tire by a flexible rubber tube which allows the indicating portion of the device to be mounted on any portion of the wheel, preferably near the axle. Placing the main bulk of the device near the axle or hub of the wheel reduces to a minimum the unbalancing effect caused by the added mass of the indicating device and allows the operator to position the individual devices in a preferred position thereby allowing the driver to view the warning devices by means of suitably placed mirrors from a single location at the driver's position in the vehicle.

In the preferred invention, a collar containing a piston and a plunger is threadedly inserted on the valve stem of the tire. The plunger is forced into the valve stem, thereby releasing air from the tire into the defined cylinder causing the piston to move in an outward direction.

A flexible liquid filled tube is connected at one end to the defined cylinder and at the opposite end to a second cylinder located as part of a light assembly. The second cylinder comprises a moveable piston operating against a compressionable spring switch assembly in response to movement of the first piston through the fluid and against the second piston.

The light assembly comprises a battery, a bulb, and the defined second cylinder.

Moving the second piston against the compressionable spring switch assembly opens an electrical path between the battery and the bulb, whereas releasing pressure on the compressionable spring switch assembly closes an electrical path between the battery and the bulb, thereby allowing the bulb to be energized.

In operation the assembly is screwed onto the valve stem of the tire being monitored which immediately causes the plunger to release fluid pressure from the tire against the first piston. Movement of the first piston exerts a pressure on the fluid located within the flexible tube, resulting in the second piston pushing against the compressionable spring switch assembly, thereby opening the electrical circuit to the bulb.

In the event the pressure exerted upon the first piston is insufficient to force the compressionable spring switch assembly into an open electrical condition, the bulb will then remain lit indicating a low pressure condition. Further, damage to the flexible rubber hose will allow the trapped fluid to be released causing the first piston to be moved a sufficient distance allowing the plunger which is attached to the piston out of contact with the valve stem thereby closing the valve stem and preserving the remaining air within the tire. At the same time, reduced pressure on the compressionable spring switch assembly will cause the bulb to be energized indicating to the operator that a low pressure condition exists.

Figure 2:
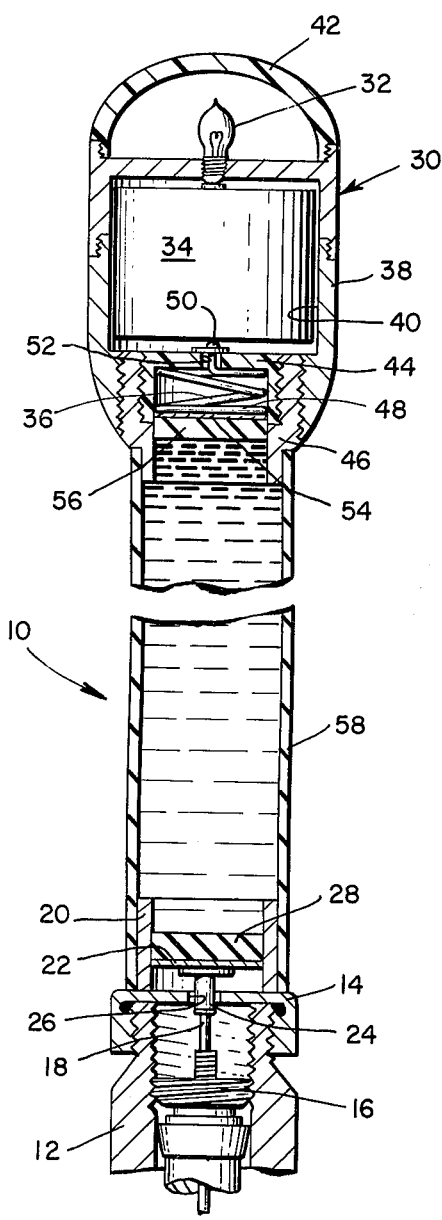

Further objects and advantages of the present invention will be made more apparent by referring now to the accompanying drawing wherein:

FIG. 1 is a cross-sectional view of the low pressure assembly indicating a low pressure condition; and FIG. 2 is a partial cross-sectional view illustrating a normal full pressure condition.

Referring now to FIG. 1 there is shown the complete indicating device 10 threadedly attached to a tire valve stem 12 by means of a collar 14.

A conventional tire valve assembly 16 is located within the tire valve stem 12 in the conventional manner and consists of a moveable stem 18 that allows air to be either inserted or removed from the tire.

The collar 14 comprises the lower end of the indicating device 10 and contains a lower cylinder 20 fixedly attached at one end to the collar 14. Located within the lower cylinder 20 is a piston 22 having a centrally located plunger 24 adapted to contact the stem 18 through a suitably located opening 26 in collar 14.

Located on the opposite side of the piston 22 is a rubber cup 28 that acts as a sealing member against the loss of liquid to be discussed.

The upper end of the indicating device 10 consists of a bulb assembly 30 that comprises a bulb 32, a battery 34, and a compressionable spring switch assembly 36.

The bulb assembly 30 consists of a metallic supporting structure 38 providing a central cavity 40 for completely enclosing the battery 34. The upper end of the metallic structure 38 provides a support for the bulb 32 and a plastic lens portion 42.

The bottommost portion of the metallic structure 38 includes an electrically non-conducting insert 44 defining the base portion of an upper cylinder and a metallic insert 46 defining the wall portion of the upper cylinder.

Located within the defined upper cylinder is the compressionable spring assembly 36 which comprises a compression spring circular at one end 48 and terminating in a point 50 at the other end. The point 50 projects through a centrally located opening 52 located within the plastic insert 44 and allows the point 50 of the spring to contact a terminal of the battery 34.

The circular portion 48 of the compressionable spring assembly 36 contacts a piston 54 which is adapted to compress the compressionable spring 36.

The piston 54 is located within the defined upper cylinder defined by the plastic insert 44 and the electrically conductive insert 46 which defines the walls of the cylinder.

A rubber sealing cup 56 is located on the other side of the piston 54 to prevent the loss of liquid to be described.

A flexible rubber tube 58 is located in a sealing relationship with the upper cylinder and specifically with the wall portion of the electrically conductive insert 46. In a similar fashion the tube 58 is in a sealing relationship with the lower cylinder and specifically with the lower cylindrical walls 20.

Upon assembly of the device 10 the tube 58 is completely filled with a liquid that is preferably hydraulic fluid so that any movement of the lower piston 22 will cause a resulting pressure against the upper piston 54 sufficient to compress the compressionable spring 36.

The illustration of FIG. 1 shows a low pressure condition in which the compressionable spring 36 is exerting a force on the upper piston 54 through the liquid and against the lower piston 22. The plunger 24 attached to the bottom side of the piston 22 is depressing plunger 18 associated with the valve 16.

The air pressure is obviously not sufficient to overcome the tension on the compressionable spring 36 thereby allowing the spring 36 to expand and in so doing the circular portion 38 contacting the piston 54 also contacts the conductive wall portion of the insert 46 defining the cylinder wall of the upper cylinder.

The electrical path from point 50 contacting the battery through the spring 36 through the conductive wall portion 46 and the conductive structure 38 to the bulb 32 contacting the other terminal of the battery 34 completes the circuit thereby allowing bulb 32 to be energized.

Referring now to FIG. 2 there is shown the device 10 attached to a tire valve stem having the proper inflated pressure.

The air pressure emanating from the tire stem fills the lower cylinder formed by the lower piston 22 thereby exerting a pressure on the fluid located within the tube 58. The upper piston 54 exerts a pressure against compressionable spring 36 causing the circular portion 48 and the upper piston 54 to move within the region of the upper cylinder bounded by the non-conductive insert 44.

This action breaks the electrical contact and the bulb 32 is extinguished as long as pressure conditions remain the same.

A review of FIGS. 1 and 2 will show that the rubber cup 28 on the lower piston 22 and the rubber cup 56 on the upper piston 54 is necessary to prevent loss of the fluid located within the flexible tube 58.

In the preferred embodiment the compressionable spring 36 need only move 1/16 of an inch between a fully conducting position and a fully non-conducting position.

The valve stem 18 located in the valve 16 on the other hand normally moves 3/32 of an inch between a fully opened condition and a fully closed condition thereby providing additional leeway for compressing the spring 36.

In the preferred installation the collar 14 is threadedly engaged on the tire valve and the bulb assembly 30 is turned and located anywhere on the wheel or hub assembly considered most advantageous for viewing the bulb 32. In addition the flexible tube 58 allows the bulb assembly 30 to be positioned and located close to the axle or hub of the wheel assembly thereby minimizing unbalance due to the mass of the light assembly itself. It is obvious that the flexible tube 58 may be constructed of any length since the pressure will at all times be the same throughout the fluid located within the tube.

An unobvious advantage is the fail-safe feature of the indicating device should the tube 58 be punctured for any reason. Considering a normal road hazard such as a sharp rock or other flying debris cutting the tube 58 will allow the liquid within the tube 58 to escape. Once the liquid is removed from the tube 58 the lower piston 22 is no longer being restrained by the compressionable spring 36 thereby allowing piston 18 of the valve stem to move and expel the plunger 24 which immediately prevents the loss of any air from the valve stem itself.

In addition, the escaping fluid allows compression spring 36 to expand thereby completing the electrical contact and turning on bulb 32 to thereby indicate a low pressure condition.

Depending upon the location of the individual bulb assemblies 30 located on each wheel the driver of the vehicle can view the individual wheels by suitably placed mirrors, thereby allowing continuous monitoring of the low pressure condition of each of the tires.

We claim:

1. A low fluid presssure indicating system comprising:

a plunger adapted to fit into and open a pressure valve assembly for releasing fluid pressure, a first moveable piston attached to said plunger and moveable by said releasing fluid pressure, a light assembly comprising a battery, a bulb, and a compressionable spring switch assembly electrically connected in series with each other, said compressionable spring switch assembly providing a closed electrical path for energizing said bulb in the normal position and an open electrical path for extinguishing said bulb in the compressed position, a second moveable piston contacting said compressionable spring switch assembly for compressing said spring switch assembly to close said electrical circuit and extinguish said bulb, and a flexible liquid filled tube connected at one end to said first moveable piston and at the other end to said second moveable piston whereby escaping fluid pressure moves said first piston causing pressure on said liquid in said tube to move against said second piston for operating said compressionable spring switch assembly.

2. A system according to claim 1 in which said first moveable piston is located in a first cylinder for accepting said releasing fluid pressure and in which maximum travel of said piston is limited by the length of said plunger.

3. A system according to claim 2 in which said first cylinder is sealed, completely entrapping and holding all of said releasing fluid pressure.

4. A system according to claim 1 in which said light assembly holds said bulb, said battery, and said compressionable spring switch assembly in a coaxial relationship.

5. A system according to claim 1 which includes a second cylinder located in said light assembly and consists of a first portion that is electrically non-conducting and a second portion that is electrically conductive.

6. A system according to claim 5 in which said compressionable spring switch assembly is located in said second cylinder and includes a compression spring circular at one end for contacting said second piston and in which the opposite end of said compression spring terminates in a point penetrating said first portion of said second cylinder for contacting a terminal of said battery.

7. A system according to claim 6 in which said compression spring electrically contacts the walls of said second cylinder and in which compression of said spring by said second cylinder causes said spring to alternately contact said second portion and said first portion of said cylinder wall.

8. A system according to claim 5 in which said first portion is the base portion and part wall portion of said second cylinder and said second portion is all wall portion of said second cylinder.

9. A system according to claim 1 in which said flexible tube is a rubber tube filled with hydraulic fluid.

10. A system according to claim 1 in which said light assembly comprises a chamber for holding said battery and said bulb in coaxial contacting alignment, a cylinder located immediately below and separated from said battery by an electrically non-conducting insert formed at the base portion of said cylinder, the remaining wall portion of said cylinder formed from an electrically conductive material.

11. A system according to claim 10 in which said compressionable spring switch assembly consists of a spring located within said cylinder and adapted to electrically contact said electrically conductive wall material of said cylinder as said spring is moved.

* * * * *